United States Patent Office 3,382,170
Patented May 7, 1968

3,382,170
METHOD OF REMOVING AN OIL FILM FROM WATER WITH SILICONE-COATED EXPANDED PERLITE
Hans Pape, Dortmund-Hoschsten, Germany, assignor to Deutsche Perlite Gesellschaft m.b.H., Dortmund, Ostenhellweg, Germany, a corporation of Germany
No Drawing. Filed Sept. 23, 1965, Ser. No. 489,764
Claims priority, application Germany, Nov. 13, 1964, D 45,841
4 Claims. (Cl. 210—36)

ABSTRACT OF THE DISCLOSURE

A method of removing an oil film from a body of water wherein mineral perlite, in an expanded state and coated with a silicone for an oleospecific adsorbent preferentially taking up oil from the water, is cast on the film.

---

My present invention relates to the selective removal of oil films from water and, more particularly, to an improved absorber for the selective adsorption of oil from water surfaces and to a method of removing oil films from bodies of water.

While it is known to provide absorbent materials capable of selectively adsorbing oily organic fluids or water and hydrophilic fluids, many of these materials are unsuitable for the selective removal of oil films from bodies of water. It is known, for example, that layers of oil upon bodies of water resulting from the accidental or purposeful discharge from oils into a body of water produce a surface film which may be combustible to endanger the area. Moreover, oil films retard the penetration of oxygen into the water and cause damage to the aquatic life therein, render bodies of water unsightly, and frequently cause contamination of areas washed by the body of water, fish drawn therefrom and persons swimming therein. On a smaller scale, oil-film contamination of bodies of water may be undesirable because of the contaminating effects of the oil. Thus it has been proposed to eliminate oil films and layers floating upon bodies of water by virtue of the lower specific gravity of the oil by casting onto the oil-covered surface adsorbent materials which draw the oil onto the adsorbent and into pores thereof.

An adsorbent material for this purpose must be in a finely divided granular or fibrous state and must have relatively fine capillaries or cellular formations throughout the particles and open at the surfaces thereof so that the liquid to be absorbed is drawn into the particles by virtue of the surface forces and surface tension of the liquid under the well-known principle of capillary attraction. Some of the materials of this nature used heretofore to remove oils from bodies of water include sand, kieselguhr, diatomaceous earth, peat fibers, sawdust and the like. While these materials are operable to a certain extent, it should be understood that there are inherent disadvantages to the use of a microporous substance in finely divided form. These disadvantages include the capillary attraction of the particles for water as well as the oily substances so that a large part of the adsorptive capacity of the particles is consumed by saturation by water and is unavailable for pick-up of the oil. This phenomenon also characterizes the so-called "expanded minerals" such as perlite which is known for its large absorptive capacity per unit weight and volume of the mineral. The useful expanded perlite may for example be saturated with water even before it is cast onto the oil film, thereby rendering a large part of its capacity unavailable. It may be mentioned at this point that another of the disadvantages of the conventional absorbents mentioned above is that, when the particles contain oil, there is some tendency to release the oil and replace it with water, thereby recontaminating precisely that region in which the presence of oil makes the use of the absorbent necessary. While expanded perlite has an exceptionally large effective surface area and a rough or discontinuous configuration thereby, making the perlite mass highly porous, as well as exceptionally high retentivity of adsorbed liquid and capability to adsorb liquids rapidly into the particles, it too cannot in its normal state absorb oil if it has previously been brought into contact with water.

It is, therefore, an important object of the present invention to provide an improved adsorbent adapted to obviate the aforementioned disadvantages and to remove oil layers from bodies of water.

A more specific object of the invention is to provide an absorptive material for the purposes described which is capable of the selective absorption of oily layers floating upon bodies of water and which yet does not evidence retransfer of oil to water from its interstices.

A further object of my present invention is to provide a method of removing oil films from bodies of water using an improved relatively water-repellent adsorbent material.

A still more specific object of the invention is to provide an absorbent material capable of soaking up oily substances from bodies of water without substantial loss of efficiency even after having been in the presence of moisture in contact with the body of water for prolonged periods.

These objects and others which will become apparent hereinafter are attained in accordance with the present invention by the use of highly absorptive expanded perlite treated in a manner which, I have discovered, renders the perlite oleospecific (i.e. capable of absorbing oil substantially to the exclusion of water). Essentially, the absorbent material is expanded perlite, i.e. mineral perlite which has been heated in the manner conventionally used for converting it to a light fluffy material suitable for incorporation in lightweight concrete, plaster, acoustic and heat insulation, catalyst-support beds and other purposes for which so-called "popped" perlite is currently employed; the expanded perlite is subjected to a treatment with a silicone emulsion or solution at a temperature of 200° C. and thereabove. The high temperature has been found to be important in order to promote total removal of the water from the silicone layer. Any residual water tends to reduce the water-repellent character of the absorbent.

"Perlite" is the common name for a well-known mineral having the appearance of a glassy rock similar to obsidian and generally containing 65%–75% by weight $SiO_2$, 10%–20% by weight $Al_2O_3$, 2%–5% by weight $H_2O$ and smaller amounts of soda, lime and potash. The expansion process, which is conventional and not considered part of the present invention, is carried out by heating the perlite, previously crushed and sized, and preferably ranging in size up to about 1 mm. to a temperature in the region of the softening point of the mineral, whereupon an auto-expansion occurs which, upon cooling of the mass, results in a fluffy mineral having the absorptive and structural characteristics described above.

According to one aspect of the present invention, cooled expanded perlite produced as described above is heated to a temperature of 200° C. or, after the expansion step, the perlite is cooled to a temperature which is below the softening point but is nevertheless above 200° C. (e.g. between about 200° and 500° C.) and is subjected at this temperature to a spray of the silicone emulsion. The watery emulsion of silicone rapidly and completely dries and appears to render the porous particles hydrophobic without affecting its porosity, capillarity or oil-absorbing qualities. After further cooling, the treated expanded-perlite particles can be cast onto the oily layer of a body of water and is found to rapidly absorb the oil without any material absorption of water even after lying in the water for prolonged periods of, say, several days.

It has previously been proposed for various reasons to coat expanded perlite with bituminous materials, a treatment which has been found to markedly lower the absorptive capacity, the rate of capillary attraction and, indeed, also to reduce the effective surface area of the particles. The mechanical incorporation of metal soaps etc. has also been suggested and found similarly deficient. By contrast, the siliconizing treatment of the present invention does not reduce the oleophilic character of the particles to any noticeable extent while rendering the particles almost totally oleospecific.

I have found that sufficient silicone coating should be used so that 400 cc. of the expanded perlite (loose pack) in a cylinder permits not less than 180 cc. of water to pass through when an initial quantity of 250 cc. is used. The retention of the siliconized perlite should thus be not more than about 0.1075 cc. of water/cc. of perlite.

Advantageously, the expanded-perlite particles are subjected to a spray of the watery emulsion of silicone, the emulsion drying in contact with the particles at a temperature of 200° C. or higher. While substantially any conventional silicone-water emulsion is suitable for the purposes of the present invention, it may be mentioned that dimethyl siloxane polymers or dimethyl silicone polymers having the general formula $[(CH_3)_2SiO]_x$ can be employed with advantage. The spray may contain between 50 and 200 cc. of silicone in the emulsion state per liter of water and the emulsion may include from, say, 0.1% to about 2% by weight of a stabilizing surface-active agent such as an alkyl phenyl ether of ethylene glycol (e.g. the nonylphenyl ether of ethylene glycol marketed under the name Tergitol). Best results are obtained when one liter or 20 to 50% by weight (preferably 30 to 40%) silicone emulsion is used per cubic meter of expanded-perlite particles; the emulsion may be diluted with about 2 liters of water/cubic meter of particles (loose packed) so that a total volume of about 3 liters/m.$^3$ is used. The expanded perlite particles are preferably treated with a fine spray or mist of the emulsion at a rate sufficient to wet the entire exposed surface thereof or by immersion in a pan of the emulsion, followed by dry heat. It is also possible to treat the expanded-perlite particles with a silicone solution in a bath, the particles being then dried. Alternatively, the loosely piled perlite can be carried on a conveyor past one or more spray heads for discharge of the emulsion or passed through a tube into which the emulsion is sprayed. Drying can then follow with the aid of an air stream at ambient temperatures or temperatures of up to about 150° C. to total dryness.

Example

Mineral perlite recovered from the ground is crushed and graded. The fraction having a particle size between substantially 10 microns and 21 mm. is heated in a conventional manner to the softening point of the mineral whereupon expansion occurs. When the expansion has terminated, the mass is crushed and cooled to a temperature between substantially 200° and 300° C. whereupon it is treated with a spray of silicone emulsion so that about 1 liter of a 30 to 40% silicone emulsion is deposited per cubic meter of expanded perlite, the total liquid content of the spray being about 3 liters per cubic meter of perlite. The particles are carried on a flat conveyor belt past a plurality of spray heads which discharge the emulsion at a rate such that all of the exposed surface of the particles are wetted with the emulsion. The emulsion contains between 50 and 200 cc. of dimethylsiloxane silicone emulsion per liter of water and about 1% by weight of the Tergitol stabilizer. The conveyor carries the particles into a drying chamber wherein air at a temperature of about 60° C. is passed over the belt whose length is sufficient to ensure complete drying of the particles before they emerge from the chamber. The particles are almost totally water repellant as judged by the absorbency test mentioned above.

The particles are then cast upon a body of water having a film of fuel oil thereon and it is found that the particles float on the surface and rapidly adsorb oil therefrom. The particles were removed upon saturation with oil and placed in a bath of water free from an oil film. The particles were left in this bath for 24 hours and showed that no significant amount of oil, based upon total increase in weight of the particles upon absorption of oil, was discharged into the water.

The invention described above is believed to admit of many modifications within the skill of workers in the art, and such modifications are intended to be included within the spirit and scope of the appended claims.

I claim:

1. A method of removing an oil film from a body of water comprising the step of casting onto said film an oleospecific adsorbent consisting essentially of silicone-coated expanded perlite.

2. A method of removing an oil film from a body of water comprising the steps of heating mineral perlite to a temperature sufficient to soften it, thereby expanding said perlite; cooling said perlite to a temperature less than its softening point but above 200° C. and treating the expanded perlite with an aqueous medium containing a silicone; completely drying the expanded perlite thus treated; and casting the dried treated expanded perlite upon said film for selectively adsorbing it without material absorption of water.

3. The method defined in claim 2 wherein said expanded perlite at said temperature between said softening point and 200° C. is treated with an aqueous emulsion of substantially 30 to 40% by weight silicone per liter of water per cubic meter of the expanded perlite diluted with substantially 2 liters of water per cubic meter of expanded perlite for effective distribution of the silicone.

4. The method as defined in claim 2 wherein said expanded perlite at said temperature between said softening point and 200° C. is treated with an aqueous solution of silicone.

References Cited

UNITED STATES PATENTS

| | | | |
|---|---|---|---|
| 2,367,384 | 1/1945 | Tymstra et al. | 210—36 |
| 2,464,204 | 3/1949 | Baker | 210—40 X |
| 2,565,107 | 8/1951 | Watts. | |
| 2,625,512 | 1/1953 | Powell. | |
| 3,127,235 | 3/1964 | Benzel | 21—60.5 |

MICHAEL E. ROGERS, *Primary Examiner.*